United States Patent [19]
Wetzel

[11] Patent Number: 5,082,295
[45] Date of Patent: Jan. 21, 1992

[54] PISTON OR ROD SEAL

[75] Inventor: Michael Wetzel, Burstadt, Fed. Rep. of Germany

[73] Assignee: Firma Carl Freudenberg, Weinheim/Bergstr., Fed. Rep. of Germany

[21] Appl. No.: 619,142

[22] Filed: Nov. 28, 1990

[30] Foreign Application Priority Data

Dec. 2, 1989 [DE] Fed. Rep. of Germany ....... 3940005

[51] Int. Cl.⁵ .............................................. F16J 15/24
[52] U.S. Cl. .................................. 277/165; 277/176; 277/177
[58] Field of Search ................. 277/165, 168, 176, 177

[56] References Cited

U.S. PATENT DOCUMENTS

| Re. 28,105 | 8/1974 | Traub | 277/165 |
| 3,909,016 | 9/1975 | Traub et al. | 277/165 |
| 4,560,174 | 12/1985 | Bisi | 277/165 |
| 4,819,952 | 4/1989 | Edlund | 277/165 |

FOREIGN PATENT DOCUMENTS 3603699 8/1987 Fed. Rep. of Germany.

Primary Examiner—William A. Cuchlinski, Jr.
Assistant Examiner—Daniel G. DePumpo
Attorney, Agent, or Firm—Sprung Horn Kramer & Woods

[57] ABSTRACT

A piston or rod seal comprising a scraper ring 2 which is made of a PTFE material and supported in a first groove 1 open toward the relatively moving machine part. This ring is pressed against the relatively moving machine part 5 by an O-ring 4 made of an elastomeric material and supported on the bottom 3 of the first groove 1. On the side facing the relatively moving machine part, the scraper ring 2 is bounded by at least two sealing edges 7 separated by a second groove 6 and, on the side facing the O-ring, it is bounded by a conical surface 8. The second groove 6 has a rounded bottom having a radius R which approximately corresponds to the radial depth T of the second groove 6. The conical surface overlaps the radial planes of all sealing edges 7 while avoiding any considerable changes in directions.

5 Claims, 2 Drawing Sheets

PISTON OR ROD SEAL

BACKGROUND OF THE INVENTION

The present invention relates to a piston or rod seal comprising a scraper ring made of a PTFE material and supported in an open first groove, the latter being disposed radially with respect to a relatively moving machine part. An O-ring made of an elastomeric material and disposed on the bottom of this first groove presses the scraper ring against the machine part. On its side facing the piston or rod, the scraper ring has at least two sealing lips separated by a second groove. These sealing lips contact the piston rod with sealing edges, and on their side facing the O-ring, they have conical surfaces with an external diameter which axially increases in the direction toward the side facing away from the pressure.

A piston rod of this type is known from the German Patent Publication No. DE-OS 36 03 669. The sealing action achieved therewith is less than satisfactory, especially over long-term use.

SUMMARY OF THE INVENTION

It is an object of the invention to further develop a piston or rod seal of the type described above such that the sealing action be substantially improved over a long-term service life.

This object, as well as other objects which will become apparent from the discussion that follows, are achieved, with a piston or rod seal of the aforesaid type and in accordance with the present invention by providing a rounded bottom in the "second groove" of the scraper ring with a radius which approximately corresponds to the radial depth of the second groove. Further, while avoiding any substantial change in direction, the conical surface overlaps at least the radial planes of all sealing edges as a continuous surface. The profile of the scraper ring is thus not subject to "notch effects" in the intermediate zone between the sealing edges coming from a radial direction either from the inside or the outside. Deformations during use of the seal in accordance with the invention are thus largely prevented. The relative association of the sealing lips to the surface of the machine part to be sealed is then largely retained over an extended service life. This is very advantageous to achieving a good sealing action. Moreover, during use in accordance with the invention, the O-ring, which is made of an elastomeric material, is supported on the bottom of the first groove and essentially determines the elastic contact pressure of the sealing edges against the relatively moving machine part. The O-ring is thus not subject to any static deformation exceeding its bearing load capacity. Rather, the O-ring is capable of following the back and forth movements of the relatively moving machine part in an elastically yielding manner. It can relax in short time intervals which ensures a superior and uniform contact pressure of the sealing lips against the machine part to be sealed over a longer period of time.

The O-ring has a circularly defined profile and a diameter which is less than the axial length of the first groove in which it is supported. In a rod seal, it rests, with the side facing radially toward the outside, on the bottom of the first groove. This bottom surrounds the rod to be sealed as a concentric cylinder surface. With its inside surface, the O-ring contacts the scraper ring on the conical surface thereof. The latter surface overlaps at least the radial planes of all sealing edges as a continuous surface while avoiding any considerable change in direction, and it has an axial length which corresponds at least to that of the cylindrical surface. This ensures a good relative mobility of the O-ring which in turn ensures that, during the power stroke, the sealing lips, succeeding one another in the direction toward the chamber to be sealed, are pressed against the rod to be sealed with the contact pressure gradually decreasing. The generation of a liquid pressure in the second groove, which exceeds the pressure level in the chamber to be sealed during the power stroke, is thus avoided.

The second groove is preferably perpendicularly spaced-apart from the conical surface. This spacing should be at least three times, advantageously at least five times, as large as the radial depth of the groove. Undesired deformations of the scraper ring during the power stroke can thus be anticipated.

The conical surface which concentrically surrounds the piston rod preferably has a conical angle between 10° and 20°. This ensures a sufficient relative mobility of the O-ring over longer periods of time in addition to a sufficient contact pressure of the piston rod to be sealed.

In the area of its axial front surfaces, the scraper ring can be provided with collars which radially protrude toward the outside, thus preventing the arrangement, which surrounds the scraper ring and the O-ring, from coming apart. This simplifies the assembly of the entire unit considerably. The aforesaid applies analogously to a piston seal. Such an analogous application of the respective features will be understood by a person skilled in the art.

The preferred embodiments of the present invention will now be described with reference to the accompanying drawings.

DESCRIPTION OF THE PREFERRED EMBODIMENTS

Figure 1:
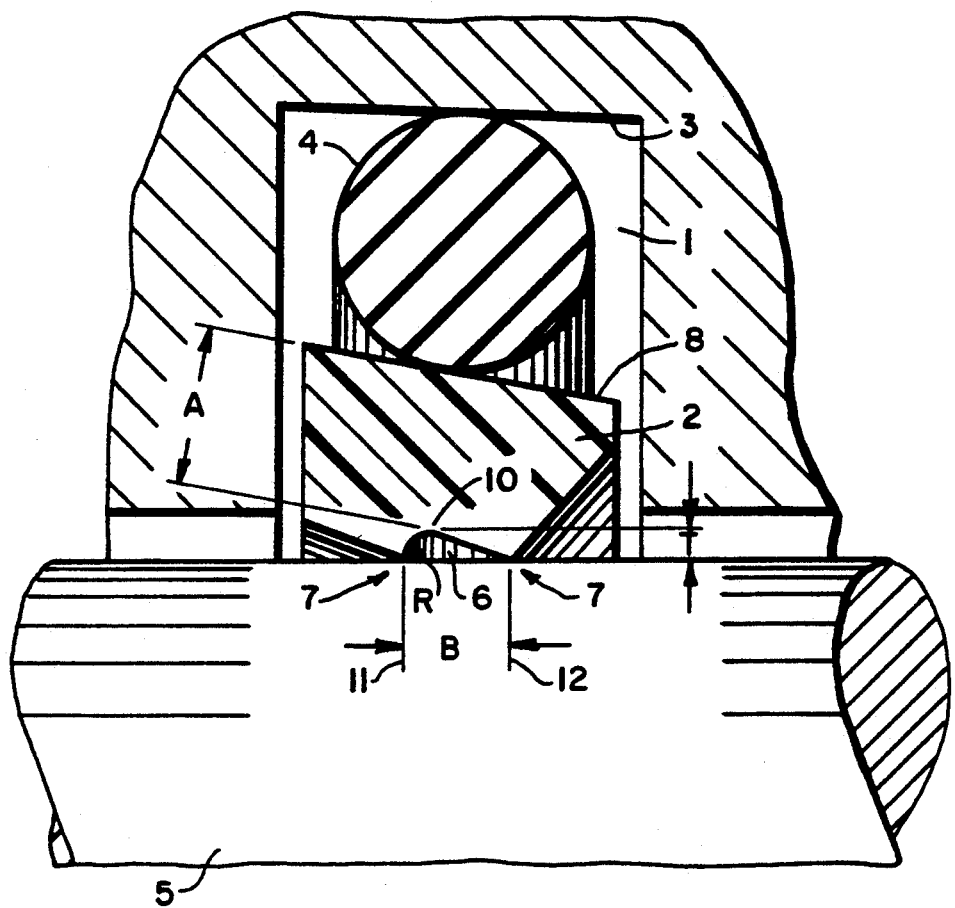
FIG. 1 is semi-sectional view of an assembled piston rod with a seal constructed according to the invention.

The piston rod seal of FIG. 1 comprises a scraper ring 2 made of PTFE-material, e.g. a filled PTFE, which is supported in a first groove radially open toward the inside. An O-ring 4 made of an elastomeric material and resting on the bottom 3 of the first groove 1 presses this scraper ring against the piston rod 5 to be sealed. On its side facing the piston rod 5, the scraper ring 2 is provided with two sealing edges 7 bounding the sealing lips and separated from one another by a second groove 6. On its side facing the O-ring 4, the scraper ring 2 is bounded by a conical surface 8. The external diameter of the latter increases in axial direction toward the side 9 facing away from the pressure. The first groove 1, the O-ring 4, the scraper ring 2 and the piston rod 5 have a rotational-symmetrical configuration and are concentrically associated with one another.

The bottom 10 bounding the second groove 6 of the scraper ring 2 in radial direction toward the outside has a radius R which corresponds to approximately the radial depth T of groove 6. The latter has very small dimensions and, regardless of the diameter of the piston rod 5 to be sealed, always ranges between 0.2 and 0.4 mm, advantageously 0.3 mm. On its outside, the scraper ring is bounded by a conical surface 8 which, as a continuous surface, overlaps at least the radial planes 11 and 12 of both sealing edges 7 while avoiding any considerable change in direction. In the represented embodiment, the conical angle of the conical surface 8 is 18°.

The second groove 6 is perpendicularly spaced-apart from the conical surface 8 at a distance A which is approximately six times the size of the radial depth T of the second groove. This and the rounded bottom 10 provided in the second groove of the scraper ring 2 account for good dimensional stability. This ensures a uniform association between the sealing lips and the piston rod 5 to be sealed over a longer period of time. Advantageously, the radial depth T of the second groove is 0.20 to 0.35 times as large as the axial distance B between adjacent sealing edges.

Figure 2:
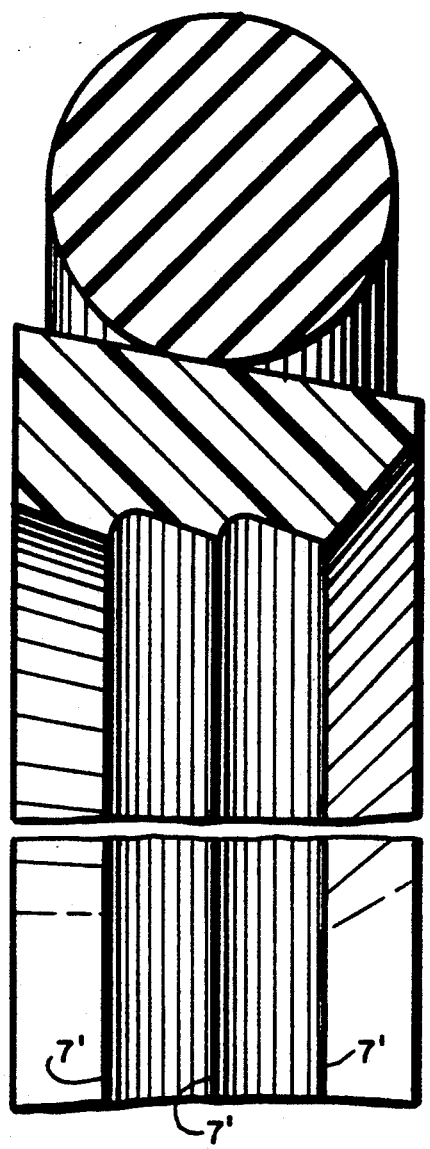
FIGS. 2 and 3 are two alternative embodiments showing portions of the seal according to the invention.

The embodiment shown in FIG. 2 is similar to that of FIG. 1. In this embodiment, however, the scraper ring has three sealing edges 7' disposed in tandem in the axial direction which improves the sealing action.

Figure 3:
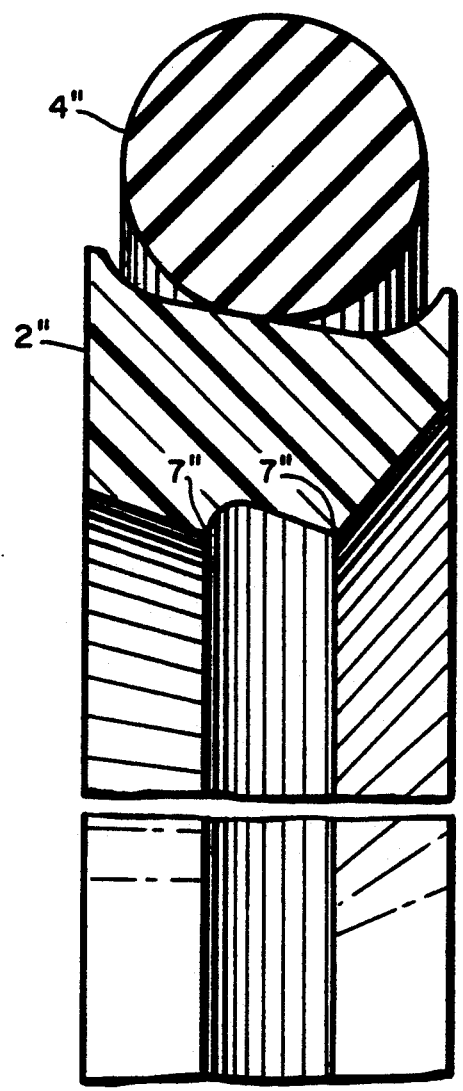

The embodiment of FIG. 3 is distinguished from the embodiments of FIGS. 1 and 2 essentially in that in the area of its axial bounding surfaces, the scraper ring 2" is provided with collars protruding toward the exterior in the radial direction. These have an external diameter which is larger than the internal diameter of the O-ring 4" in a relaxed state. When the entire unit is not yet assembled, the O-ring 4" and the scraper ring 2" thus form a self-contained unit which facilitates mounting.

There has thus been shown and described a novel piston or rod seal which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. In a cylindrical seal, comprising an annular scraper ring which is made of a PTFE material and is supported in a first cylindrical groove radially open toward a cylindrical surface of a relatively moving cylindrical machine part, the scraper ring being pressed against the relatively moving machine part by means of an O-ring made of an elastomeric material and supported on the bottom of the first groove, wherein the scraper ring, on the side facing the relatively moving machine part, has at least two sealing edges defining respective radial planes and being separated by a second groove with a radial depth T and wherein, on the side facing the O-ring, the scraper ring has a conical surface with an external diameter which increases axially in a direction toward the side facing away from pressure to be sealed, the improvement wherein the second groove has a rounded bottom with a radius R which is approximately equal to the radial depth T of the second groove and wherein the conical surface is a continuous surface that overlaps at least the radial planes of the sealing edges.

2. The cylindrical seal in accordance with claim 1, wherein the second groove is perpendicularly spaced-apart from the conical surface at a distance A, the latter being at least three times as large as the depth T of the second groove.

3. The cylindrical seal in accordance with claim 1, wherein the second groove is perpendicularly spaced from the conical surface by a distance A which is at least five times as large as the radial depth T of the second groove.

4. The cylindrical seal in accordance with claim 1, wherein the second surface has a conical angle of 5° to 30°.

5. The cylindrical seal in accordance with claim 1, wherein the radial depth T of the second groove is 0.20 to 0.35 times as large as the axial distance B between adjacent sealing edges.

* * * * *